US006657138B2

(12) United States Patent
Klauer et al.

(10) Patent No.: US 6,657,138 B2
(45) Date of Patent: Dec. 2, 2003

(54) ELECTRONIC WEIGHING SENSOR WHICH CHANGES THE DC COMPONENT OF THE WEIGHT SIGNAL BASED ON THE MAGNITUDE OF THE VIBRATION-DEPENDENT COMPONENT

(75) Inventors: Alfred Klauer, Goettingen (DE); Joerg Peter Martens, Bovenden (DE)

(73) Assignee: Sartorius AG, Goettingen (DE)

( * ) Notice: Subject to any disclaimer, the term of this patent is extended or adjusted under 35 U.S.C. 154(b) by 122 days.

(21) Appl. No.: 09/860,556

(22) Filed: May 21, 2001

(65) Prior Publication Data

US 2001/0052431 A1 Dec. 20, 2001

(30) Foreign Application Priority Data

May 19, 2000 (DE) .......................................... 100 24 986

(51) Int. Cl.[7] .............................................. G01G 3/147
(52) U.S. Cl. .............................. 177/185; 177/210 EM; 177/212; 702/101
(58) Field of Search ........................ 177/185, 210 EM, 177/212; 702/101

(56) References Cited

U.S. PATENT DOCUMENTS

| | | | | |
|---|---|---|---|---|
| 3,789,937 A | * | 2/1974 | Strobel et al. | ........... 177/210 R |
| 3,986,571 A | * | 10/1976 | Strobel et al. | ............... 177/185 |
| 4,039,036 A | * | 8/1977 | Baumgartner et al. | ...... 177/212 |
| 4,553,618 A | * | 11/1985 | Kusmenskji et al. | ....... 177/185 |
| 4,624,331 A | * | 11/1986 | Naito | ........................... 177/185 |
| 4,977,526 A | * | 12/1990 | Jost et al. | ................. 177/25.13 |
| 5,062,492 A | * | 11/1991 | Inoue | .......................... 177/185 |
| 5,117,929 A | * | 6/1992 | Nakamura et al. | .......... 177/185 |
| 5,347,092 A | * | 9/1994 | Buchs et al. | ................. 177/212 |
| 5,665,941 A | * | 9/1997 | Wehhofer et al. | ........ 177/25.13 |
| 5,789,713 A | | 8/1998 | Wakasa et al. | ............... 177/185 |

FOREIGN PATENT DOCUMENTS

| | | | |
|---|---|---|---|
| DE | 2 323 200 | 1/1974 | |
| DE | 2323200 | * 1/1974 | ............. 177/201 R |
| DE | 4001614 A1 | 7/1991 | |
| EP | 0617262 A1 | 9/1994 | |

OTHER PUBLICATIONS

"Feedback Control of Dynamic Systems", Franklin et al., Addison–Wesley Publishing CO., Reading MA, pp. 540–556. Copyroght 1986.*

* cited by examiner

*Primary Examiner*—Randy Gibson
(74) *Attorney, Agent, or Firm*—Sughrue Mion, PLLC

(57) ABSTRACT

An electronic weighing sensor (10) having a digital signal processing unit (19), which includes at least one filter (12) with low-pass characteristic. By means of the filter (12), the direct-current component (m) is determined from the output signal of the weighing sensor and the weighing result is derived therefrom. A signal, which is dependent on the amplitude of the vibrations, is determined by the digital signal processing unit (19) and electronic components (18) change the direct-current component (m) as a function of the magnitude of the vibration-dependent signal. This significantly improves the performance of the weighing sensor (10) with respect to shocks and vibrations in the installation site of the weighing sensor (10).

20 Claims, 3 Drawing Sheets

ELECTRONIC WEIGHING SENSOR WHICH CHANGES THE DC COMPONENT OF THE WEIGHT SIGNAL BASED ON THE MAGNITUDE OF THE VIBRATION-DEPENDENT COMPONENT

The following disclosure is based on German Patent Application No. 100 24 986.8, filed on May 19, 2000, which is incorporated into this application by reference.

FIELD OF AND BACKGROUND OF THE INVENTION

The present invention relates to an electronic weighing sensor having a digital signal processing unit, which includes at least one filter with a low-pass characteristic. By means of the filter, the direct-current component of the output signal of the weighing sensor is determined and the weighing result is derived therefrom.

Weighing sensors of this type are generally known in the art. The low-pass filter is used to suppress the alternating-current components, which are superimposed on the output signal of the weighing sensor when the installation site of the weighing sensor is subject to shocks or vibrations. Generally, despite this measure, the measuring results of weighing sensors and scales that are based on weighing sensors are clearly more difficult to reproduce if the installation site is subject to shocks or vibrations than if the installation site is steady.

To improve the performance of weighing sensors and scales at unsteady installation sites, it is known, for instance from U.S. Pat. No. 5,789,713, to provide a second, weighing sensor having a constant load whose output signal is used to derive a correction signal for the actual (measuring) weighing sensor. The mechanical and electronic complexity caused by this second weighing sensor is considerable, however.

Similarly, German laid-open document DE 40 01 614 A1 teaches the provision of at least one acceleration sensor instead of a second, constantly-loaded weighing sensor, which supplies a correction signal for influencing the measuring result. In both cases, however, the correction signal must be subtracted from the signal of the (measuring) weighing sensor in such manner that the phases of both signals are properly taken into account so that the interference can be corrected. This in-phase subtraction, however, can be achieved within only a limited frequency band. At the upper end of this frequency band, the phase shifts are more and more increased and differ between the measuring path and the correction path. This results, in the worst case, in an addition—and thus an amplification—of the signals rather than a subtraction—and thus a cancellation. This is particularly true for acceleration sensors that are employed as correction generators, since the mechanically very differently structured system of the acceleration sensor has eigenfrequencies that are very different from those of the weighing sensor.

OBJECTS OF THE INVENTION

It is one object of the present invention to improve the performance of a weighing sensor in case of shocks and vibrations in the installation site without requiring a second weighing sensor or an acceleration sensor for correction purposes. Therein, problems due to phase shifts at the edge of the frequency range are to be avoided.

SUMMARY OF THE INVENTION

According to one formulation of the invention, this and other objects are achieved by providing a method for deriving a weighing result, in which a direct-current component of an output signal of an electronic weighing sensor is determined by means of a low-pass filter that is arranged in a digital processing unit. In addition, a further signal is determined by the digital processing unit that is dependent on an amplitude of vibrations of the electronic weighing sensor. The direct-current component is changed by electronic components in accordance with a magnitude of the further signal that is dependent on the amplitude of the vibrations.

This approach is based on the finding by the inventors that the poor reproducibility of weighing sensors at unsteady installation sites is not only caused by inadequate suppression of the alternating-current component in the output signal of the weighing sensor. Rather, a significant contribution to the poor reproducibility is due to the fact that the direct-current component in the output signal of the weighing sensor is influenced as a function of the amplitude and the frequency range of the alternating-current component. Thus, stronger suppression of the alternating-current component in the output signal of the weighing sensor alone does not sufficiently improve the performance of a weighing sensor that is subject to vibrations. In addition to that, a correction of the direct-current component must be carried out, as proposed by the present invention.

The causes for this influence on the direct-current component may be illustrated by three examples:

In the case of weighing sensors that have a non-linear characteristic—as shown in FIG. 1 in exaggerated form—and that are installed at a steady installation site, the load $m_1$ is associated with the output signal corresponding to point A. In an unsteady site, however, the output signal fluctuates between the extreme points B and C along the non-linear characteristic B-A-C. Depending on the amplitude spectrum of the vibrations, the direct-current component of this output signal is located somewhere between points A and D. As a result, even if the alternating-current component in the output signal is completely suppressed, the direct-current component changes due to the non-linearity of the characteristic curve. This change is suppressed by the electronic components according to the present invention.

In the case of weighing sensors that operate based on the principle of electromagnetic force compensation, as illustrated schematically in FIG. 2, a coil 2, through which a current flows, is located in the magnetic field of a permanent magnet 1. The current flowing through the coil 2 is regulated by a position indicator 3 and by a downstream regulation amplifier 4 in such a manner that the electromagnetically generated force is precisely equal to force F to be measured. The magnitude of this current is measured at a measurement resistor 5 and is supplied to an output 6 as an output signal of the weighing sensor. As is well known, the quantitative relation between the magnetic field B, the current I and the generated force F is:

$$F \approx B \cdot I \quad (1)$$

To achieve optimal efficiency, the coil 2 is positioned in such a way that it is located at the point of the maximum magnetic field of the permanent magnet 1. If the coil 2 is caused to oscillate due to vibrations in the base, the coil 2 moves sometimes outside the magnetic field maximum and into a region with a lower magnetic field. On temporal average, the magnetic field B in equation (1) is thus lower than in a steady installation site where coil 2 is always located within the magnetic field maximum. Consequently, according to equation (1), a greater average current I is required to generate the same force F. Thus, in this example too, the direct-current component changes when there are shocks/vibrations so that, in addition to suppressing the alternating-current component, the direct-current component must also be corrected in order to obtain a stable and exact result.

If the characteristic curve of the position indicator 3 in the above-described weighing sensor according to FIG. 2 is asymmetrically non-linear, the average transient position is shifted when there are vibrations, as illustrated above by means of FIG. 1. On the one hand, this change in the average transient position causes a change in the effective magnetic field at the position of the coil, as shown in the second example. On the other hand, a slight deflection in the parallel guidance 7 of the scale tray 8 and coil 2 is caused by this change. If the parallel guidance 7 is realized by spring-type hinges, this causes a vertical spring force, which changes the direct-current component in the weighing signal.

Other causes, which are not further described here, may also distort the direct-current component in the weighing signal, e.g., non-linear amplifiers or non-linear transmission levers. Of course, all the described effects are small and, therefore, have consequences at high resolutions of the weighing sensor only.

Advantageous embodiments are set forth in the dependent claims.

The use of a high-pass filter for determining the vibration-dependent alternating-current components in the output signal of a weighing sensor and the control of a display element or a print lock (in case the alternating-current component exceeds a predefined limit value) is generally known in the art of scale technology. Such structures and methods are described, for instance, in German Patent DE 23 23 200. In the prior art, however, no influence is effected on the direct-current component of the output signal of the weighing sensor.

BRIEF DESCRIPTION OF THE DRAWINGS

The invention and further advantageous refinements of the invention according to the features of the dependent claims are explained in more detail below with the aid of diagrammatic, exemplary embodiments in the drawings, in which:

DETAILED DESCRIPTION OF THE PREFERRED EMBODIMENTS

Figure 1:
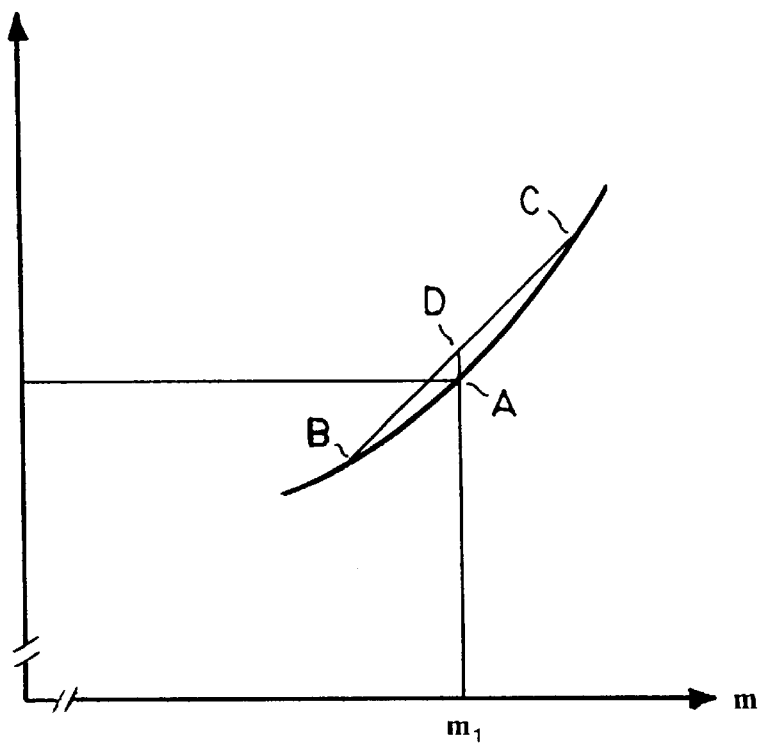
FIG. 1 shows a non-linear characteristic curve of a weighing sensor.
Figure 2:
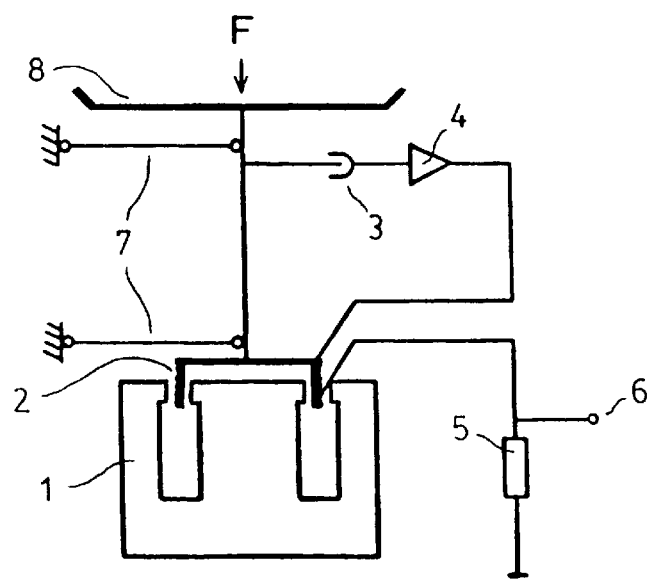
FIG. 2 shows a weighing sensor that operates in accordance with the principle of electromagnetic force compensation.

FIGS. 1 and 2 have already been described in the "Summary of the Invention".

Figure 3:
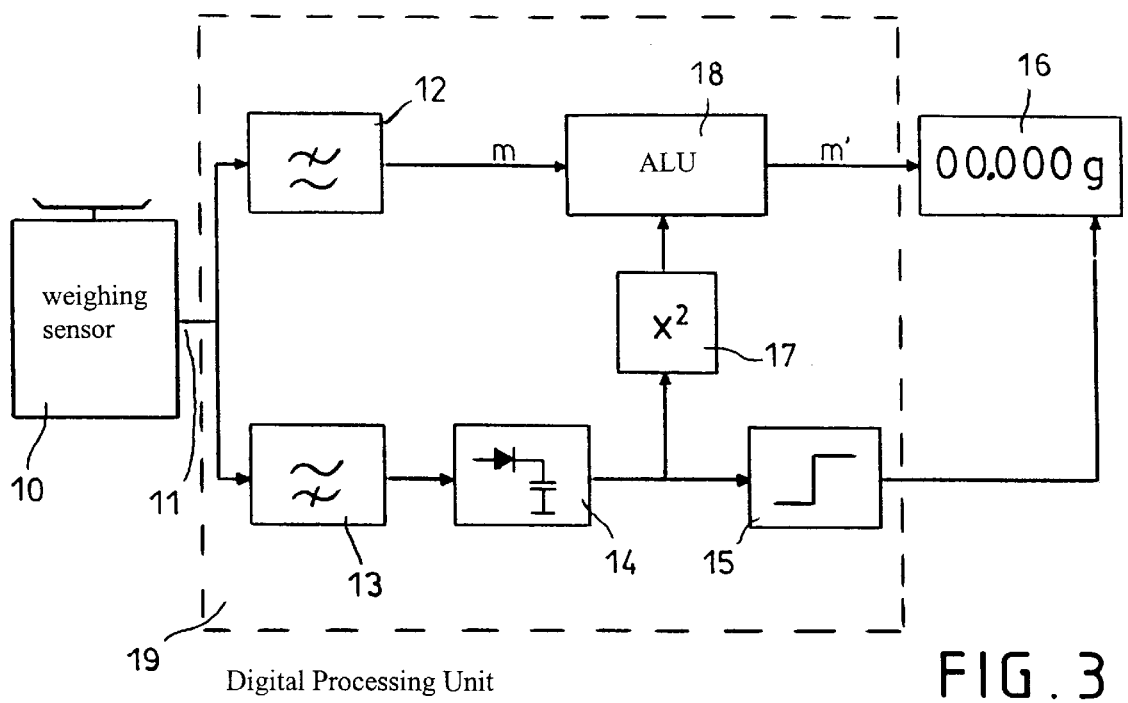
FIG. 3 is a block diagram of a first embodiment of the weighing sensor according to the present invention.

The block diagram of FIG. 3 shows a weighing sensor 10 to whose output 11 both a low-pass filter 12 and a high-pass filter 13 are connected. At its output, the low-pass filter 12 supplies a signal m, which is proportional to the direct-current component of the output signal of the weighing sensor 10. Thus, the signal m is essentially proportional to the loading of the weighing sensor 10. The high-pass filter 13, at its output, supplies a signal that is proportional to the alternating-current component of the output signal of the weighing sensor 10. Thus, this signal is proportional to the vibrations of the weighing sensor at constant loading of the weighing sensor 10. This signal is rectified and slightly smoothed (block 14, wherein the diode and the capacitor in the drawing symbolize this generally and should not be construed as being limited to one-way point rectification) and is thus proportional to the average alternating-current component of the output signal of the weighing sensor 10. On the one hand, the signal is then supplied to a threshold comparator 15, as known in the prior art. If the signal level is below the threshold, the threshold comparator 15 causes the gram symbol "g" in a display 16 to light up. On the other hand, the signal is supplied to an arithmetic logic unit 18 via a squaring element 17. In the arithmetic logic unit 18, a corrected output signal m' is calculated from the (uncorrected) input signal m (of low-pass filter 12) and a correction signal $x^2$ of the squaring element 17 according to e.g. the following formula:

$$m'=m+(a \cdot m+b) \cdot x^2 \qquad (2)$$

If the installation site is steady, i.e., $x^2=0$, then m'=m. If the installation site is unsteady, an addend that is proportional to the square of the alternating-current component x is added to the direct-current component m of the output signal of the weighing sensor 10. The factor "b" corrects for load-independent effects, while the factor "a" corrects for effects that increase with the loading of the weighing sensor. The quantity and sign of "a" and "b" depend on the physical causes of the effect and thus the behavior of the individual weighing sensor. In the case of the weighing sensor having a non-linear characteristic according to Example 1 and FIG. 1 of the "Summary of the Invention", "a" and "b" depend on the sign and the curvature of the characteristic curve. In the example shown in FIG. 1, "a"=0 and "b" is negative, provided that the curvature of the characteristic curve is constant, i.e., independent of the loading of the weighing sensor 10. In the weighing sensor according to Example 2 and FIG. 2 of the "Summary of the Invention", which is based on the principle of electromagnetic force compensation and where the effect is caused by a decrease in the magnetic field, "b"=0 and "a" is negative. In the third example of the non-linear position indicator, both "a" and "b" are not equal to 0. The quantity of "a" is determined by the decrease in the magnetic field, whereas the quantity and sign of "b" are determined by the non-linearity of the position indicator and by the magnitude of the spring constant of the parallel guidance.

The quantity of the correction factors "a" and "b" must be determined and defined for each weighing sensor type in accordance with its individual behavior. It should be noted that $x^2$ in equation (2) and in FIG. 3, i.e., the squared alternating-current component, is ordinarily an appropriate parameter to use. However, in some special cases, a deviating dependence on the magnitude of the alternating-current component may occur, in which case a different equation would be used to perform the correction.

The corrected value m' is then forwarded by the arithmetic logic unit 18 to the display unit 16.

The above description omits all the other standard computational processes with the output signal of the weighing sensor, e.g., balancing/taring and calibrating, but they are of course carried out.

The components of the circuit described individually above are typically realized by a single digital signal processing unit 19 in the form of a microprocessor. The filters 12 and 13 are advantageously implemented as digital filters and are realized within the digital signal processing unit 19. In FIG. 3, all of the components that can be realized by the microprocessor of the digital signal processing unit 19 are boxed with a dashed line.

If the filters 12 and 13 are digital filters, the output signal of the weighing sensor 10 must of course also be digital or must be digitized by an analog/digital converter, which would have to be seen as part of the weighing sensor 10 in FIG. 3. The filters 12 and 13 (and the rectification and smoothing 14) can of course also be analog filters, which are directly connected to the analog output signal of the weighing sensor 10. The squaring element 17 and the arithmetic logic unit 18 can also be analog, in which case the corrected value m' would have to be digitized only in front of the digital display unit 16. Today, however, at least the arithmetic logic unit 18 will typically be digital, so that a respective analog/digital converter must be installed behind the analog low-pass filter 12 and behind the analog smoothing component 14 or behind the squaring element 17.

Figure 4:
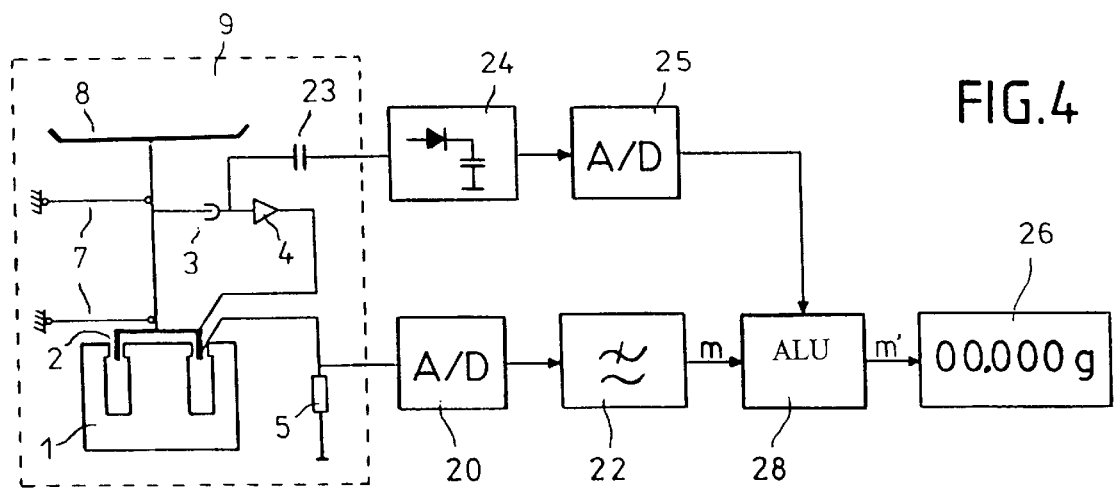
FIG. 4 is a block diagram of a second embodiment of the weighing sensor according to the present invention.

FIG. 4 shows a second embodiment of the weighing sensor according to the present invention. A weighing sensor 9 operates according to the generally known principle of electromagnetic force compensation, which was briefly described above: A coil 2 is located in the air gap of a permanent magnet 1. A current I, which flows through the coil 2, is regulated by means of a position indicator 3 and a regulating amplifier 4 such that the electromagnetically generated force is precisely as large as the force generated by the object being weighed on a scale tray 8. Therein, the scale tray 8 is guided by a parallel guidance 7. At a measurement resistor 5, the load-proportional output voltage is tapped, digitized (analog/digital converter 20) and supplied to a digital low-pass filter 22. The vibration-dependent signal is tapped directly at the position indicator 3 via a capacitor 23. This signal is rectified, smoothed (block 24) and digitized (analog/digital converter 25) and represents the correction signal x. In an arithmetic logic unit 28, the correction is carried out in accordance with equation (2), wherein $x^2$ is being formed in the arithmetic logic unit too.

The corrected value m' is displayed in a display unit 26. This embodiment is essentially distinguished from the first embodiment according to FIG. 3 in that the vibration-dependent signal is tapped directly by the position indicator 3 and is not derived from the output signal of the weighing sensor 9/10. Thereby, the frequency-dependent influence of the regulating amplifier 4 is avoided. In addition, the vibration-dependent signal is tapped directly where the cause of the effect in weighing sensors according to the principle of electromagnetic force compensation lies: at the position indicator 3, which detects the position of coil 2 and thus directly the deviation of the coil position from the maximum magnetic field. For instance, any resonance sharpness that occurs on the coil 2 at certain frequencies is detected by the position indicator 3 and is not partly suppressed by the PID regulation behavior of the regulation amplifier 4. Only then is the resonance sharpness detected in the output signal of the weighing sensor 9.

Figure 5:
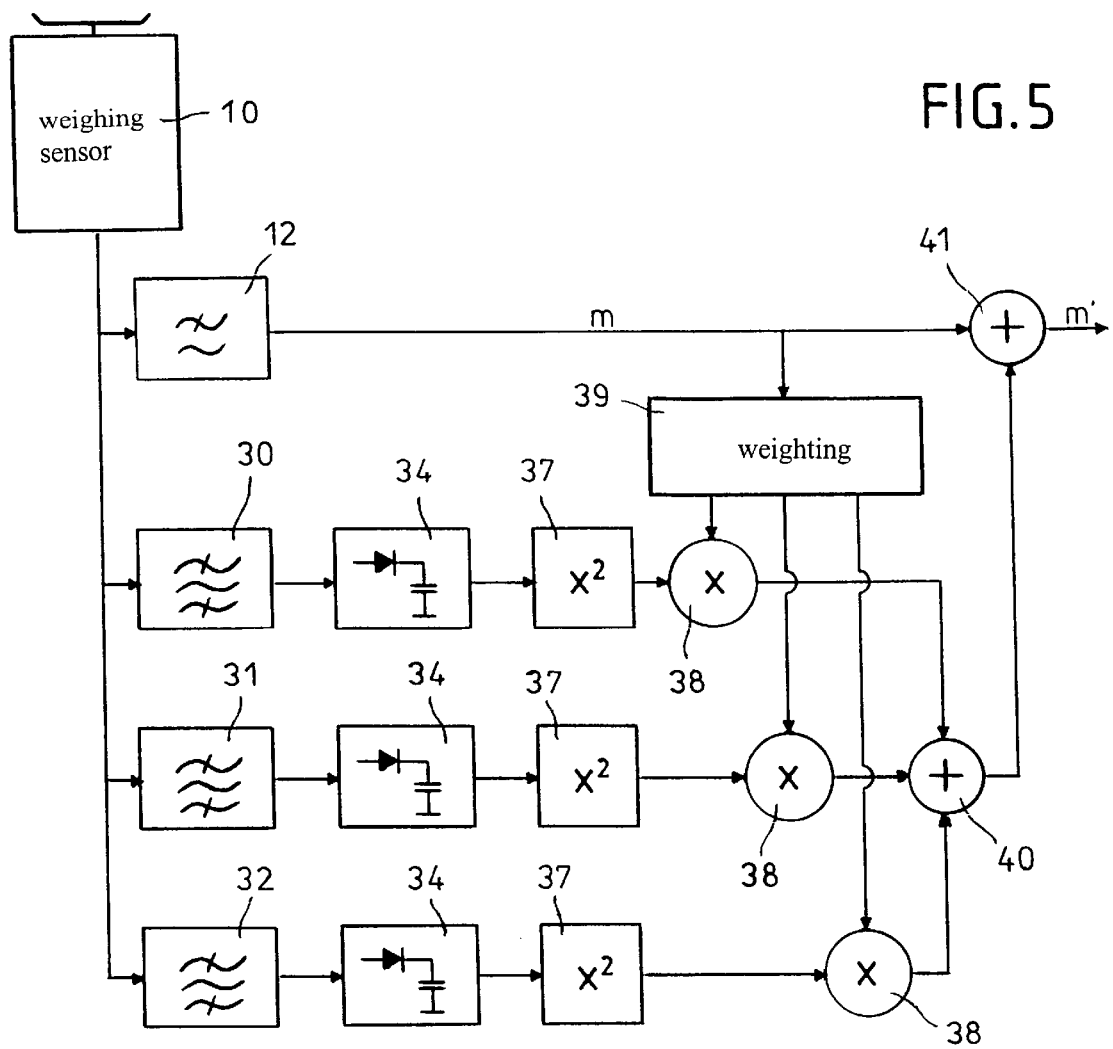
FIG. 5 is a block diagram of a third embodiment of the weighing sensor; according to the present invention.

FIG. 5 shows a third embodiment of the weighing sensor according to the present invention. The output signal of the weighing sensor 10, which is again assumed to be digital, is supplied to the low-pass filter 12 and to three bandpass filters 30, 31 and 32. Each bandpass filter is adjusted to one of the resonance frequencies of the weighing sensor. Each bandpass filter filters out this frequency range from the output signal of the weighing sensor 10. A rectifier and smoothing module 34 is connected downstream from each bandpass filter. Subsequently, a respective squaring element 37 is connected to each rectifier and smoothing module 34. The output signal of these squaring elements 37 is the vibration-dependent signal with reference to the corresponding frequency range. In subsequent multiplying units 38, each of these signals $x^2$ is multiplied by the coefficient (a·m+b) according to equation (2). Therein, the coefficients (a·m+b) are provided by a memory and multiplication unit 39 labeled "weighting." In the three bandpass filters shown, three coefficients "a" and three coefficients "b" are also stored in the unit 39. The results of the multiplying units 38 are added up in an adder 40. The sum is then added to the signal m in an adder 41. The circuit according to FIG. 5 operates exactly the same way as the circuit according to FIG. 3 except that the circuit according to FIG. 5 can carry out the correction separately for three different frequency ranges. Thus, the circuit according to FIG. 5 corrects different behaviors of the weighing sensor 10 in the different frequency ranges. The number of three bandpass filters and thus three frequency ranges is of course only an example; any other number is possible. Likewise, equation (2) is only an exemplary linkage of m' and m. In the general case, the following equation is valid:

$$m' = m + \sum_j f_i(a_i, b_i, m, x_i) \qquad (3)$$

where $f_1$ is any function and the index i relates to the different frequency ranges. In the example of FIG. 5, therefore, i=1 . . . 3. The coefficients $a_i$ and $b_i$ represent weighing sensor-specific constants. The dependence of the individual $x_i$ will in many cases be squared—as shown in equation (2)—but any other dependence is also possible.

Figure 6:
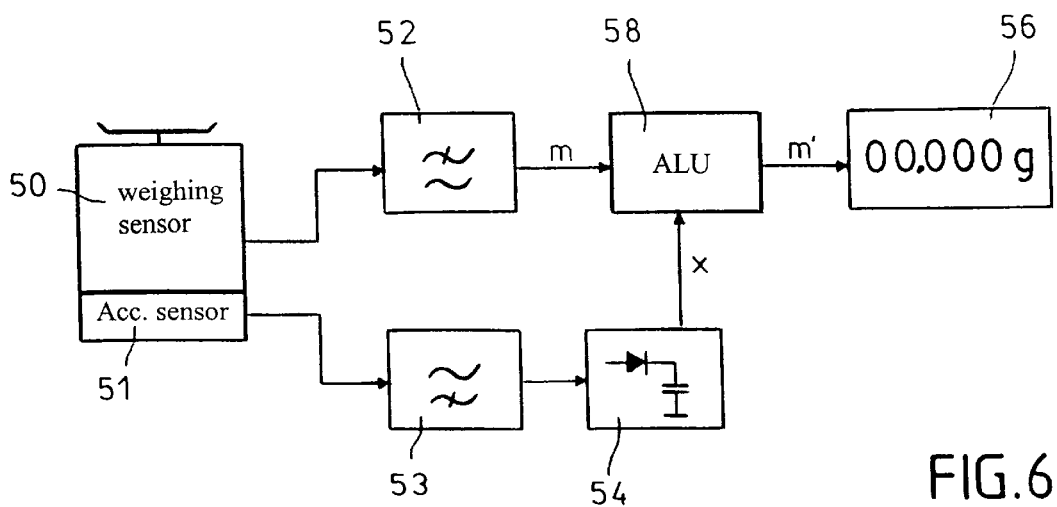
FIG. 6 is a block diagram of a fourth embodiment of the weighing sensor according to the present invention.

FIG. 6 shows a fourth embodiment of the weighing sensor according to the present invention. The output signal of an actual weighing sensor 50 is supplied to a low-pass filter 52 and yields signal m. The vibration-dependent signal is derived from an acceleration sensor 51, which is fixed to the base point of the weighing sensor 50. Depending on the structure of the acceleration sensor 51, the output signal is either directly supplied to a rectifier and smoothing module 54 (if the acceleration sensor, because of its structure, detects only alternating accelerations anyway) or via an interposed high-pass filter 53 (if the acceleration sensor 51 also detects direct-current components, or if its frequency behavior significantly deviates from the required frequency behavior). The correction signal x thus obtained changes the direct-current component m from the low-pass filter 52 in the arithmetic logic unit 58, as described above. The result m' is displayed in a display unit 56. What has been described above in the other embodiments regarding analog or digital filters and the correction equation applies to this embodiment as well.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A method for deriving a weighing result, comprising:
   determining a direct-current component of an output signal of an electronic weighing sensor with a low-pass filter arranged in a digital processing unit;
   determining a further signal with the digital processing unit, wherein the further signal is dependent on an amplitude of vibrations of the electronic weighing sensor; and
   changing the direct-current component with electronic components in accordance with a magnitude of the further signal that is dependent on the amplitude of the vibrations.

2. The method of claim 1, wherein the further signal that is dependent on the amplitude of the vibrations is determined from the output signal of the electronic weighing sensor with a high-pass filter.

3. The method of claim 1, wherein the electronic weighing sensor operates according to electromagnetic force compensation, and wherein the further signal that is dependent on the amplitude of the vibrations is derived from an output signal generated by a position indicator of a closed-loop control circuit of the electromagnetic force compensation.

4. The method of claim 1, wherein the further signal that is dependent on the amplitude of the vibrations is derived from an output signal of an acceleration sensor of the electronic weighing sensor.

5. The method of claim 1, wherein the direct-current component is changed due to a non-linear characteristic of the electronic components.

6. The method of claim 5, wherein the non-linear characteristic is influenced by an output signal of the low-pass filter.

7. The method of claim 1, wherein the direct-current component is changed due to a frequency-dependent characteristic of the electronic components.

8. The method of claim 7, wherein the frequency-dependent characteristic is influenced by an output signal of the low-pass filter.

9. The method of claim 1, wherein the further signal that is dependent on the amplitude of the vibrations is divided into several frequency ranges, and wherein respective, different characteristics are associated with the several frequency ranges.

10. The method of claim 9, wherein the respective, different characteristics are influenced by an output signal of the low-pass filter.

11. A method for deriving a weighing result, comprising:
    determining a direct-current component of an output signal of an electronic weighing sensor
    determining a further signal that is dependent on an amplitude of vibrations of the electronic weighing sensor; and
    changing the direct-current component in accordance with a magnitude of the further signal that is dependent on the amplitude of the vibrations.

12. A weighing arrangement, comprising:
    an electronic weighing sensor; and
    a digital processing unit, comprising:
       at least one low-pass filter for determining a direct-current component from an output signal of the electronic weighing sensor; and
       electronic components for changing the direct-current component in accordance with a magnitude of a further signal that is dependent on an amplitude of vibrations of the electronic weighing sensor.

13. The weighing arrangement of claim 12, further comprising a high-pass filter configured to determine the further signal that is dependent on the amplitude of the vibrations of the electronic weighing sensor.

14. The weighing arrangement of claim 13, wherein the low-pass filter, the high-pass filter, and the electronic components are digital components that are arranged within the digital processing unit.

15. The weighing arrangement of claim 13, wherein the electronic components are program parts that are arranged within the digital processing unit.

16. The weighing arrangement of claim 12, further comprising a closed-loop control circuit for electromagnetic force compensation, which comprises a position indicator configured to provide an output signal from which the further signal that is dependent on the amplitude of the vibrations of the electromagnetic weighing sensor is derived.

17. The weighing arrangement of claim 12, wherein the electronic weighing sensor comprises an integrated acceleration sensor configured to provide an output signal from which the further signal that is dependent on the amplitude of the vibrations of the electronic weighing sensor is derived.

18. The weighing arrangement of claim 12, wherein the electronic components comprise non-linear characteristics which change the direct-current component.

19. The weighing arrangement of claim 12, wherein the electronic components comprise frequency-dependent characteristics which change the direct-current component.

20. The weighing arrangement of claim 12, wherein the digital processing unit further comprises band filters configured to divide the further signal that is dependent on the amplitude of the vibrations of the electronic weighing sensor into several frequency ranges.

* * * * *